United States Patent
Booton et al.

(10) Patent No.: US 8,526,358 B2
(45) Date of Patent: Sep. 3, 2013

(54) SYSTEM AND METHOD OF DOPPLER AND LOCAL OSCILLATOR COMPENSATION IN A TDMA SYSTEM

(75) Inventors: Richard Booton, Fairport, NY (US); Clifford Hessel, Rochester, NY (US)

(73) Assignee: Harris Corporation, Melbourne, FL (US)

( * ) Notice: Subject to any disclaimer, the term of this patent is extended or adjusted under 35 U.S.C. 154(b) by 898 days.

(21) Appl. No.: 12/690,407

(22) Filed: Jan. 20, 2010

(65) Prior Publication Data

US 2011/0176479 A1    Jul. 21, 2011

(51) Int. Cl.
*H04B 7/212*    (2006.01)

(52) U.S. Cl.
USPC ............ 370/321; 370/337; 370/347; 370/442

(58) Field of Classification Search
USPC .................. 370/321, 336, 337, 345, 347, 442
See application file for complete search history.

(56) References Cited

U.S. PATENT DOCUMENTS

| | | |
|---|---|---|
| 5,874,913 A | 2/1999 | Blanchard et al. |
| 6,529,485 B1 | 3/2003 | Agarwal et al. |
| 7,012,973 B1 | 3/2006 | Piirainen |

FOREIGN PATENT DOCUMENTS

| | | |
|---|---|---|
| GB | 1 246 491 A | 9/1971 |
| WO | 99 04510 A1 | 1/1999 |

OTHER PUBLICATIONS

Extended European Search Report mailed Nov. 30, 2012, Application Serial No. 11000393.6-1246 / 2348649 in the name of Harris Corporation.

*Primary Examiner* — Ronald Abelson
(74) *Attorney, Agent, or Firm* — Fox Rothschild, LLP; Robert J. Sacco

(57) ABSTRACT

System and method for determining an optimal transmission center frequency for a traffic station (30) in a satellite communication system (100) includes transmitting, by the traffic station (30) in a first uplink channel, a first burst of information in a first uplink TDMA frame to a satellite (10) and receiving, by the traffic station (30) in a first downlink channel, a downlink TDMA frame including a reference burst (210) and the first burst of information. A Doppler offset ratio is calculated based on a measured frequency shift of the received first burst of information. A local oscillator offset ratio is calculated based on a measured frequency shift of the reference burst and the Doppler offset ratio. An adjusted transmission frequency of a second uplink channel is calculated based on the Doppler offset ratio and the local oscillator offset ratio.

28 Claims, 5 Drawing Sheets

100

SYSTEM AND METHOD OF DOPPLER AND LOCAL OSCILLATOR COMPENSATION IN A TDMA SYSTEM

BACKGROUND OF THE INVENTION

1. Statement of the Technical Field

The invention is directed to a satellite radio system. In particular, the invention is directed to a system and method for compensating for errors in the frequency of a transmitted signal caused by local oscillator variation and a shift in frequency due to the relative movement of a transmitter and a receiver.

2. Description of the Related Art

In wireless communication systems, including systems based on satellite communications, each of the devices connected to the communication system requires a stable local timing source. Generally, the timing sources in each of the devices must be synchronized in some way.

In a typical wireless communication system, an analog carrier signal is modulated by analog data or a digital bit stream containing information of interest to be transmitted. The carrier signal is typically a sinusoidal waveform at a frequency that is much higher than the frequency content of the information of interest. The carrier signal is typically generated using a local timing source in the transmitter. The modulated carrier signal is transmitted to the receiver.

The receiver in the wireless communication system demodulates the received signal to extract the information of interest. The receiver typically uses its own local timing source to demodulate the received signal. Any difference in frequency between the local timing source in the receiver and the local timing source in the transmitter will introduce a frequency error in the demodulated information of interest.

This problem is exacerbated when the transmitter and receiver are moving relative to one another. Such movement introduces an effect known as Doppler shift. Doppler shift is a perceived change in the frequency of a signal for an observer moving relative to the source of the signal. When the transmitter and receiver are moving towards one another, the frequency of the signal received at the receiver is higher, compared with the frequency of the signal emitted by the transmitter. Conversely, if the transmitter and receiver are moving away from one another, the receiver will receive a signal having a lower frequency than the signal emitted by the transmitter.

To reduce the effect of frequency errors, highly accurate timing sources may be used in each device connected to the wireless communication network. This technique reduces errors associated with differences in the frequency of the local timing sources included in each device. However, it is generally not practical to include such timing sources in every device connected to the communication network due to the high cost of highly accurate and stable local timing sources. Another option is to install highly accurate and stable timing sources in only some devices connected to the communication network. At least one of the devices containing a highly accurate and stable timing source is used as a reference timing source. Each of the other devices connected to the network uses a less expensive but tunable timing source, such as voltage controlled oscillator (VCXO) or a direct digital synthesizer (DDS). The low cost timing source, e.g., DDS, is tuned such that the local timing source is phase and frequency locked to the reference timing source.

A conventional satellite communication system employing Time Division Multiple Access (TDMA) includes a plurality of earth stations and a satellite transponder. The satellite transponder receives signals from the earth stations at one frequency, i.e., the uplink frequency, and retransmits the signals to the earth stations at different frequency, i.e., the downlink frequency. In a TDMA system, the earth stations have designated timeslots within a communications period called a frame in which to transmit a burst of information within each channel. In some cases, the frame is of such short duration that users transmitting low data rates, e.g., voice data, appear to receive continuous service.

One or more of the earth stations is designated as a reference station, which typically includes a highly accurate and stable timing source. The reference station produces a reference burst once per TDMA frame. The remaining earth stations, i.e., the traffic stations, use the information provided in the reference burst to synchronize their local timing sources to that of the reference station. For example, the receive timing of a traffic station may be modified based on the center frequency and arrival time of the reference burst.

Although this technique is effective when the transmitter and receiver are motionless with respect to one another, this is generally not the case in a satellite communication system. The reference burst received by each traffic station usually includes a Doppler shift caused by the daily movement of the satellite. The Doppler shift is significant when low earth orbits, medium earth orbits, and highly elliptical orbits are used. However, even a geostationary satellite will move with respect to the earth stations due to orbit imperfections. The Doppler shift will be different for each traffic station depending on the particular traffic station's position with respect to the satellite. Additionally, if the traffic station is portable, e.g., a hand-held radio, a Doppler shift caused by the movement of the traffic station will also be introduced.

There are generally strict tolerances with respect to the frequency error allowed to be introduced by a traffic station when transmitting to the satellite via an uplink frequency channel in a TDMA system. From the perspective of the satellite transponder, the signals received from each traffic station may have a different frequency when compared to the frequency of the signal produced by the reference station, i.e., the reference frequency. These frequency errors will propagate through to the particular downlink channel. The burst from each transmitting traffic station includes a preamble containing carrier and clock recovery sequence bits that can be used by the receiving traffic station to determine the center frequency and bit rate of the burst. The required length of the preamble is a function of the frequency uncertainty and other parameters, such as the signal-to-noise ratio at the receiving traffic station. As the frequency uncertainty increases, so does the length of the required preamble. Thus, the bandwidth efficiency of the TDMA system is a function of the acceptable transmit frequency error in the system.

The transmit frequency error, as seen by the satellite transponder, is a function of both Doppler shift and the error due to the differences between the frequencies of the local timing sources of the transmitting earth station and the reference station. For a traffic station to transmit a signal with minimal error, both the error introduced by the local timing source, and the error introduced by Doppler shift must be taken into account.

Thus, in a TDMA based satellite communication system, there is a need for a method for compensating for errors due to differences in the frequency of the local timing sources and Doppler frequency shift.

SUMMARY OF THE INVENTION

According to an aspect of the invention a method and system is provided for separately determining the frequency error of a local timing source in a traffic station with respect to a timing source in a reference station and the expected Doppler shift of a signal transmitted from the traffic station to a satellite. The center frequency of a signal to be transmitted to the satellite is adjusted to thereby minimize the frequency error of the signal as received at the satellite.

In an embodiment of the invention, the traffic station transmits a ranging burst of information to a satellite in an uplink TDMA frame by modulating the information onto a carrier wave. The traffic station may transmit a ranging burst on a control channel during initial acquisition of the signals transmitted by the satellite. Although the burst of information transmitted on the uplink channel is described herein as a ranging burst, any burst of information transmitted by the traffic station and retransmitted by the satellite may be used by the traffic station to perform the methods described herein.

The satellite retransmits the burst back to the traffic station as part of a downlink TDMA frame at a different center frequency. The traffic station analyzes the received burst to determine the amount of frequency shift that occurred, ignoring the difference between the uplink and the downlink center frequencies. A Doppler offset ratio is calculated based on the measured amount of frequency shift. The Doppler offset ratio is equivalent to the relative velocity of the traffic station with respect to the satellite divided by the speed of the carrier wave.

The reference station introduces a reference burst into each TDMA frame. The reference burst is analyzed by the traffic station to determine a downlink frequency offset, which is a measure of the frequency shift caused by the combination of the Doppler shift due to the relative velocity of the satellite with respect to the traffic station and the frequency difference between the timing source in the reference station and the traffic station's local timing source. A local oscillator offset ratio may be calculated based on the downlink frequency offset, the expected downlink center frequency, and the Doppler offset ratio.

The transmit center frequency of the traffic station can then be adjusted based on the local oscillator offset ratio and the Doppler offset ratio to produce an uplink signal that will be received at the satellite with minimal frequency error.

In TDMA frames where a ranging burst is not available, it can be assumed that the local oscillator offset ratio remains unchanged due to the generally low rate of change in the local timing source. Thus, any frequency shift changes detected when analyzing the reference burst are assumed to be the result of a change in the relative velocity between the satellite 10 and the traffic station 30.

In TDMA frames where a ranging burst is not available, the reference burst is analyzed to determine a downlink frequency offset. The downlink frequency offset is a measure of the frequency shift caused by the combination of the Doppler shift due to the relative velocity of the satellite with respect to the traffic station and the timing difference between the timing source in the reference station and the traffic station's local timing source. A downlink offset ratio is calculated based on the measured downlink frequency offset and the known downlink channel center frequency. The previously determined local oscillator offset ratio is subtracted from the downlink offset ratio to determine the Doppler offset ratio.

The transmit frequency of the traffic station can then be adjusted based on the previously calculated local oscillator offset ratio and the newly calculated Doppler offset ratio to produce an uplink signal that will be received at the satellite with minimal frequency error.

DESCRIPTION OF THE DRAWINGS

Embodiments will be described with reference to the following drawing figures, in which like numerals represent like items throughout the figures, and in which.

DETAILED DESCRIPTION

Figure 1:
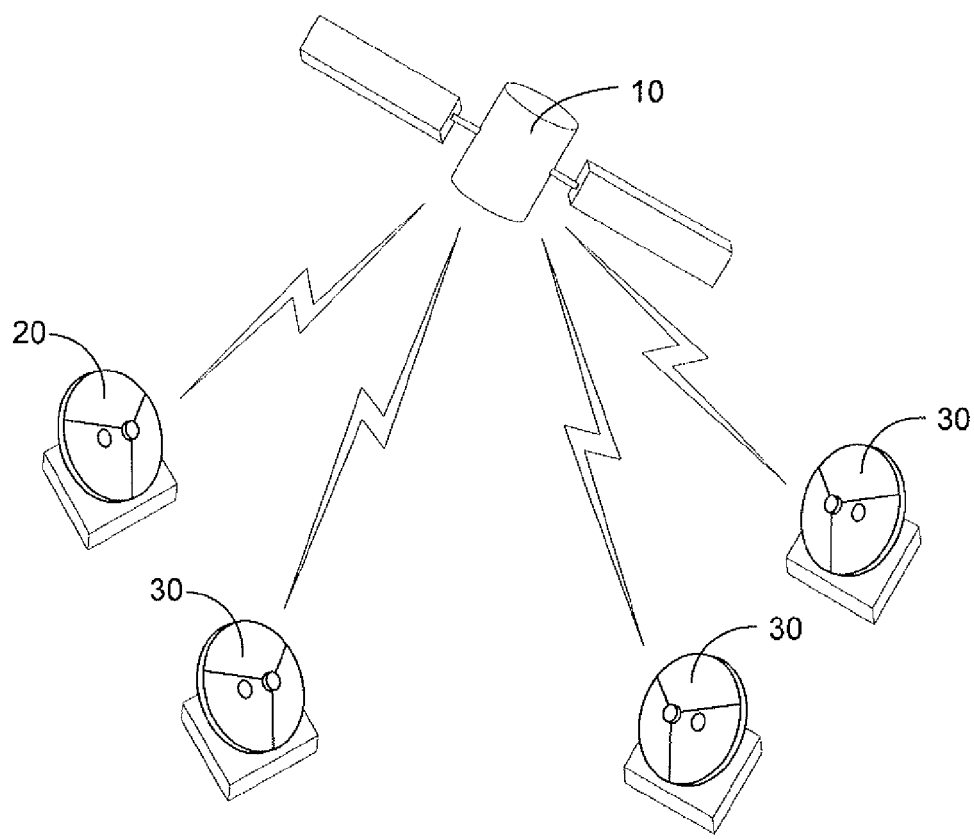
FIG. 1 is a block diagram of a satellite communication system according to an embodiment of the invention.

The present invention is described with reference to the attached figures, wherein like reference numerals are used throughout the figures to designate similar or equivalent elements. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operations are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

Referring now to FIG. 1, there is provided a block diagram of a communication system in accordance with an embodiment of the present invention. As shown in FIG. 1, the communication system 100 includes a satellite 10 and earth stations 20, 30. The earth stations may include one or more reference stations 20, and a plurality of traffic stations 30. The satellite 10 may include a simple transponder that converts all signals received in a first frequency band to a second frequency band and retransmits the signals to the earth stations. Alternatively, the satellite 10 may process the received signals before retransmission. The earth stations 20, 30 may be located in a fixed location or, alternatively, may be mobile devices.

In an embodiment of the invention, the satellite 10 includes a satellite transponder that receives signals from the earth stations 20, 30 at an uplink center frequency, and retransmits the signals to the earth stations 20, 30 at a different downlink center frequency. The system 100 may employ multiple frequency channels on both the uplink and the downlink. Each channel is defined by a center frequency and a bandwidth. The bandwidth of each of the channels may be the same, or may differ depending on the rate of the data to be transmitted using the particular channel.

Access to each of the channels may be shared among the earth stations using TDMA. In a TDMA system, the earth stations 20, 30 have designated timeslots within a communications time period called a frame in which to transmit a burst of information within each channel. In the communication system 100, one or more of the earth stations is designated as the reference station 20, which typically includes a highly accurate and stable timing source. The remaining earth stations are designated as traffic stations 30.

Figure 2:
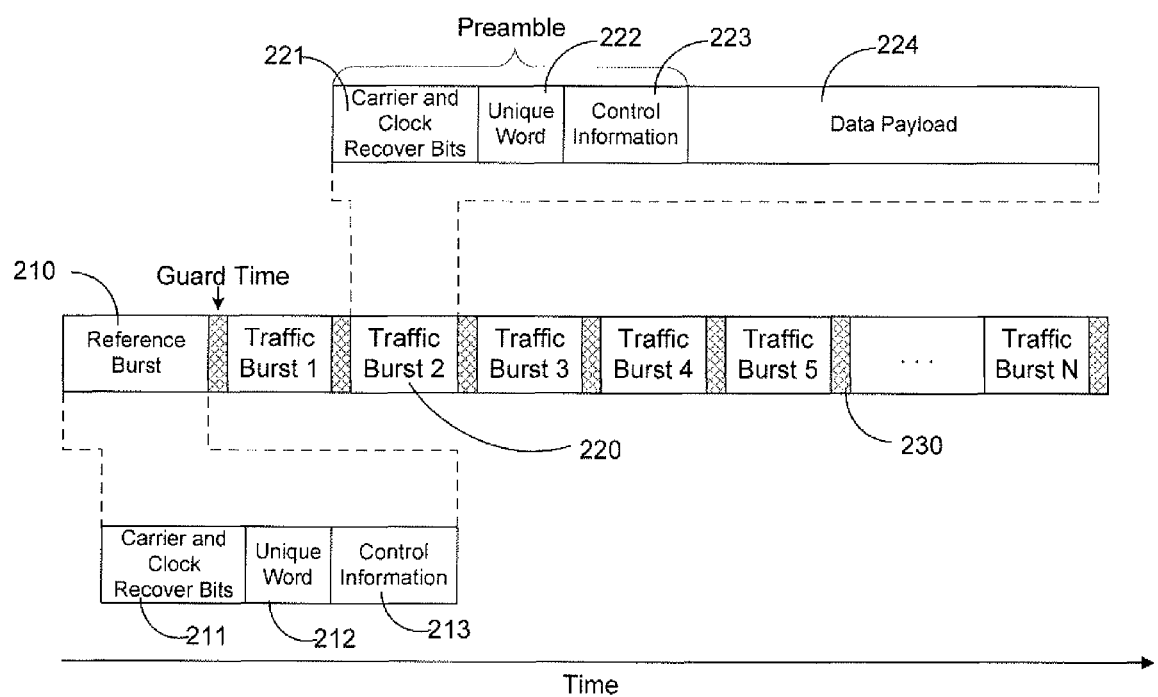
FIG. 2 is an illustration of a typical TDMA frame.

FIG. 2 illustrates a typical TDMA frame. As shown in FIG. 2, the reference burst 210, which is transmitted by the reference station 20 in each TDMA frame, may include a carrier and clock recovery bit sequence 211. The carrier and clock recovery bit sequence 211 may be used by traffic stations 30 to accurately determine the bit rate and frequency of the reference burst 210. The reference burst 210 may also include a known bit sequence, i.e., a unique word 212, that the traffic stations 30 use to determine the position of the start and end of the TDMA frame. This information is required by the traffic stations 30 so that the traffic stations 30 can transmit and receive data at the appropriate times. Other control information 213 may be included in the reference burst 210, such as information used to assign time slots and frequency channels to each of the traffic stations 30. Although the TDMA frame is illustrated as including only a single reference burst 210, multiple reference bursts may be included from one or more reference stations 20 to improve system reliability by providing a redundant reference station. Additionally, the TDMA frame of FIG. 2 is a simplified example of a representative TDMA frame. The present invention is not limited to a system including a frame with the described structure, but is equally applicable to other frame structures known in the relevant art.

The traffic stations 30 may also transmit during the TDMA frame period. Typically, the reference station 20 provides control information to the traffic stations 30 defining when the traffic stations 30 may transmit, so that no two traffic stations transmit at the same time on the same frequency channel. The traffic stations 30 transmit one or more traffic bursts 220, which typically include a preamble with carrier and lock bits, a unique word 222, and possibly other control information 223. The information in the preamble is used by the earth station 20, 30 that receives the burst to accurately establish the center frequency of the transmitted burst and the bit-rate. The traffic burst 220 also includes a data payload section 224, which contains the information of interest that is to be transmitted.

As illustrated in FIG. 2, guard time 230 is typically allowed for between each of the traffic bursts 220 in the TDMA frame. Each of the traffic stations 30 must time their transmission such that the transmitted signal reaches the transponder in the satellite at the appropriate time. Each traffic station 30 must account for the delay caused by the distance between the traffic station 30 and the satellite 10. Guard time 230 is allocated to account for errors associated with the transmission timing of the traffic stations 30.

There are generally strict tolerances with respect to the frequency error allowed to be introduced by a traffic station 30 when transmitting to the satellite 10 via an uplink frequency channel in a TDMA system. From the perspective of the satellite transponder, the signals received from each traffic station 30 may each have a different frequency when compared to the frequency of the signal produced by the reference station 20. These frequency errors will propagate through to the particular downlink channel. In order for a receiving traffic station to effectively receive a signal produced by a different traffic station, the traffic burst 230 from the transmitting traffic station includes a preamble containing carrier and clock recovery sequence bits 221. The preamble is used by the receiving traffic station to accurately establish the center frequency and bit-rate of the received burst. The required length of the preamble is a function of the frequency uncertainty and other parameters, such as the signal-to-noise ratio at the receiving traffic station. As the frequency uncertainty increases, so does the required length of the preamble. Thus, the bandwidth efficiency of the TDMA system is a function of the acceptable transmit frequency error in the system.

The transmit frequency error, as seen by the satellite transponder, is a function of both Doppler shift and the error due to the differences between the frequency of the local timing source of the transmitting traffic station 30 and the reference station's 20 timing source. For a traffic station 30 to transmit a traffic burst 220 with minimal frequency error, both the error introduced by the local timing source, and the error introduced by Doppler shift must be taken into account.

To determine an optimal transmission center frequency, it is insufficient for the traffic station 30 to determine only the composite frequency shift on the downlink. For example, if a traffic station 30 determines that the reference burst 210 it receives on the downlink channel is at a higher than expected frequency, the appropriate response differs depending on the cause of the frequency shift. If the frequency shift is caused entirely by a timing difference between the timing source in the reference station 20 and the timing source in the traffic station 30, i.e., there is no Doppler shift, then the appropriate response is for the traffic station 30 to increase the center frequency of the signal being transmitted by the traffic station 30 relative to a nominal center frequency. In contrast, if the detected frequency shift is the result of only Doppler shift, then the appropriate response is for the transmit station 30 to decrease the center frequency of the signal to be transmitted to counteract the Doppler shift that will occur in the uplink transmission to the satellite 10. Typically, the detected downlink frequency shift is caused by a combination of timing differences and Doppler shift. Thus, to properly react to the detected frequency shift, the individual components that caused the shift must be known separately.

Figure 3:
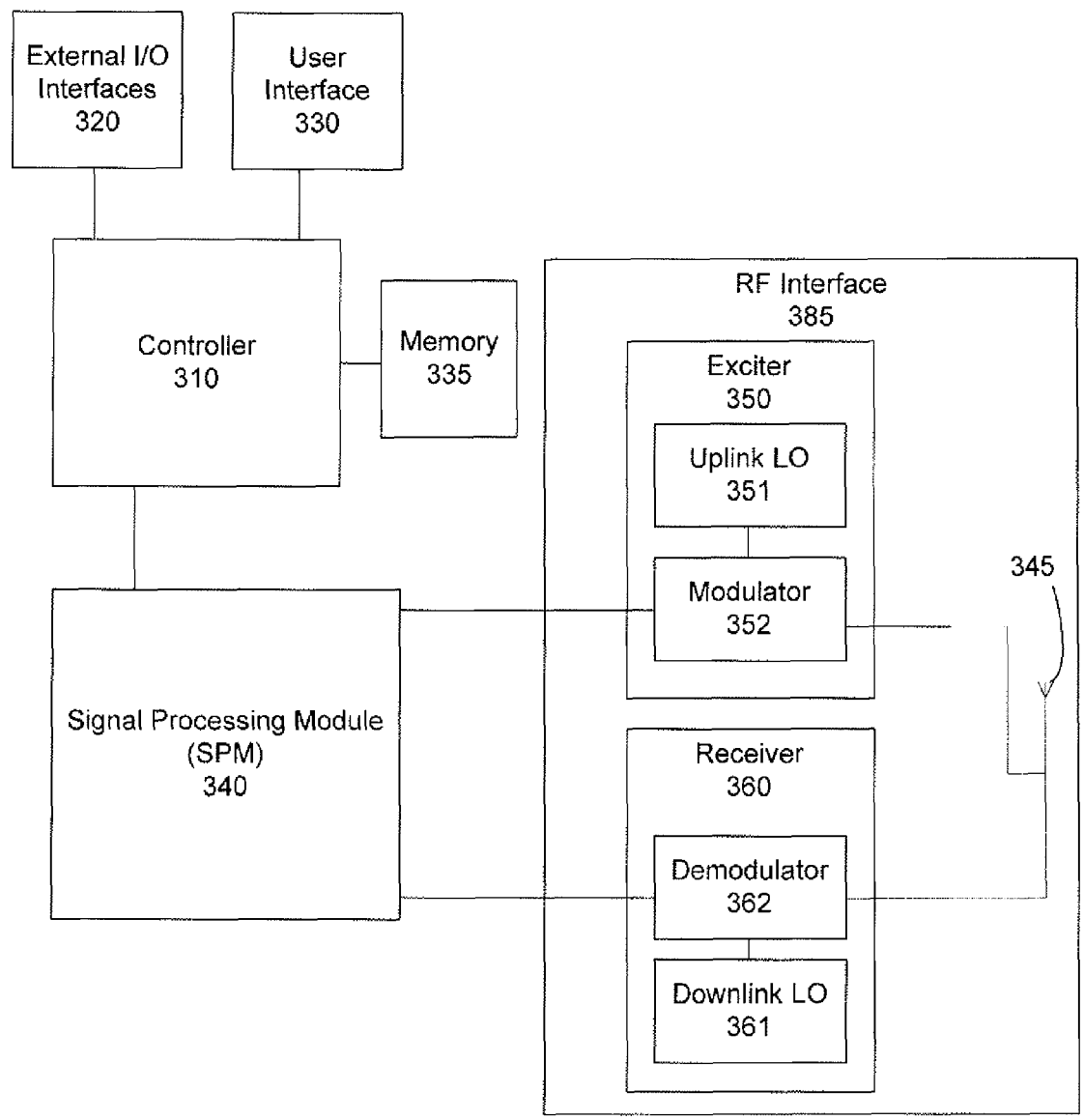
FIG. 3 is a high level block diagram of a traffic station according to the embodiment of the invention.

Referring now to FIG. 3, there is provided a block diagram of a traffic station 30 in accordance with an embodiment of the present invention. The traffic station 30 may be a small device, such as a portable device that can easily be carried by a user. Alternatively, the traffic station 30 may be installed in a fixed location.

The traffic station 30 may include a controller 310. The controller 310 may include one or more microprocessors, microcontrollers, application-specific integrated circuits (ASICs) and programmable devices, such as a field programmable gate arrays (FPGAs) or complex programmable logic devices (CPLDs). The controller 310 may also have access to memory 335. The memory 335 may include volatile memory, such as static or dynamic RAM, and non-volatile memory, such as ferroelectric memory, magnetoresistive memory, flash memory, or a hard disk drive. The memory 335 may be used to store program instructions (e.g., software code), calibration information, and other information required by the controller 310.

The controller 310 may also connect to one or more external I/O interfaces 320. Examples of external I/O interfaces include ports for USB, serial, Ethernet, and Firewire, among others. Such interfaces are well known to persons skilled in the art, and thus, will not be described in great detail herein. A user can interact with the controller 310 through the External I/O interfaces 320 to upgrade software code and to transfer information to and from the controller 310.

The memory 335 can include a computer-readable storage medium on which is stored one or more sets of instructions (e.g., software code) configured to implement one or more of the methodologies, procedures, or functions described herein. A computer-readable medium containing instructions may also be connected to the controller 310 via one of the external I/O interfaces 320. The instructions can also reside, completely or at least partially, within the controller 310. The controller 310 may execute the program instructions to perform the functions assigned to the controller 310. Alternatively, the methods, procedures, or functions described herein can be implemented using dedicated hardware implementations. Thus, the exemplary system is applicable to software, firmware, and hardware implementations.

The traffic station 30 may include a user interface 330. The user interface 330 may include buttons, switches, knobs, and a keyboard that a user can use to interact with the controller 310. The user interface may also include a display, which provides status information to the user. A speaker and a microphone may also be included in the user interface 330 for the transmission and reception of sound information.

The controller 310 is connected to and communicates with a signal processing module (SPM) 340 Like the controller, the SPM 340 may include one or more microprocessors, microcontrollers, dedicated digital signal processors (DSPs), ASICs, and programmable devices, such as FPGAs and CPLDs. The SPM 340 need not be separate from the controller. The functions of the SPM 340 may be included in the controller 310.

The traffic station 30 also includes a Radio Frequency (RF) interface. The RF interface 385 includes an exciter 330, an output power amplifier (not shown), a receiver 360, an input power amplifier (not shown), and an antenna 345. There are many different possible methods of implementing the RF interface 385. Although FIG. 3 illustrates only a single antenna 345, as is well known in the art, separate transmit and receive antennas may be used. Multiple transmit and/or receive antennas may also be used to provide for diversity transmission and reception and/or beam-forming. Each of the exciter 350, the receiver 360, and the antenna 345, are well known to persons skilled in the art. Thus, these components will not be described in great detail herein. However, a brief discussion of the RF interface 385 architecture is provided to assist the reader in understanding the present invention.

The exciter 350 includes a modulator 352 and a local oscillator 351. The function of the exciter 350 is to modulate data onto a carrier wave, i.e., an RF signal, derived from the uplink local oscillator 351. The data to be modulated is provided to the exciter 350 by the SPM 340. The RF signal, which carries the data, is amplified using an output power amplifier (not shown) and sent to the antenna 345. The uplink signal is thereby broadcast to the satellite 10.

The receiver 360 includes a demodulator 362 and a downlink local oscillator 361. The downlink signal is received from the antenna 345 and amplified by an input power amplifier (not shown). The amplified input signal is then demodulated by the receiver 360 using the Downlink local oscillator 361. Data is thereby extracted from the downlink signal. The extracted data may be provided to the SPM 340 as digital samples.

The SPM 340 sets the frequency of the local oscillators 351, 361 and the gain of the power amplifiers. The frequency of the local oscillators is typically defined by the particular uplink and downlink channels being used. If the uplink and downlink channels have the same center frequency, the RF interface may include only a single local oscillator (not illustrated) that is shared by the exciter 350 and the receiver 360.

In accordance with an embodiment of the invention, the traffic station 30 optimally sets the center frequency of the RF signal to be transmitted to the satellite 10 on an uplink channel to minimize the frequency error associated with the signal when it is received at the satellite 10. To accomplish this, the traffic station 30 first transmits a ranging burst to the satellite 10 in an uplink TDMA frame. The satellite 10 retransmits the burst back to the traffic station 30 as part of a downlink TDMA frame. The traffic station 30 analyzes the received signal to determine the amount of frequency shift that occurred, ignoring the difference between the uplink and the downlink center frequencies. A Doppler offset ratio may be calculated based on the measured amount of frequency shift. The Doppler offset ratio is defined as the relative velocity of the traffic station 30 with respect to the satellite 10 divided by the speed of the carrier wave.

The reference burst 210 that is included in the received downlink TDMA frame may be analyzed to determine a downlink frequency offset. The downlink frequency offset is caused by a combination of the Doppler shift due to the relative velocity of the satellite 10 with respect to the traffic station 30 and the timing difference between the timing source in the reference station 20 and the traffic station's local timing source. A local oscillator offset ratio may be calculated based on the downlink frequency offset, the expected downlink center frequency, and the Doppler offset ratio.

The transmit frequency of the traffic station 30 can then be adjusted by the local oscillator offset ratio and the Doppler offset ratio to produce an uplink RF signal that will be received at the satellite 10 with minimal frequency error.

Figure 4:
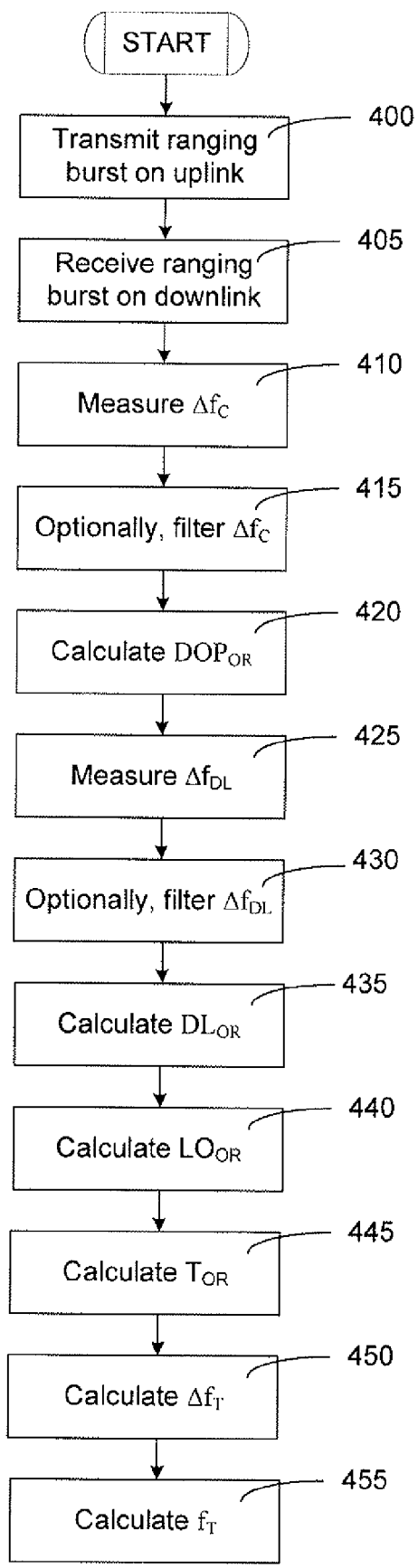
FIG. 4 is a flow diagram of a method of determining an optimal transmit center frequency when a ranging burst is included in a received TDMA frame in accordance with an embodiment of the invention.

Referring now to FIG. 4, a flow diagram is provided that illustrates a method for determining a Doppler offset ratio and an Oscillator offset ratio that may be used to optimally set the center frequency for a signal to be transmitted by the traffic station 30.

In step 400, a ranging burst is sent by the traffic station 30 to the satellite 10 on an uplink channel. The transmitted ranging burst is received by the satellite 10 and retransmitted via the satellite transponder on a downlink channel. In practice, any burst of information sent by the traffic station in an uplink TDMA frame may be used to implement the described method.

In step 405, the traffic station 30 receives the ranging burst on the downlink channel from the satellite 10.

In step 410, the traffic station 30 analyzes the received ranging burst to determine a combined frequency offset ($\Delta f_C$) that occurred during propagation of the signal from the traffic station 30 to the satellite 10 and back, ignoring the difference between the uplink and downlink center frequencies. Thus, $\Delta f_C$ does not include the expected frequency offset between the uplink and downlink channels, but only the offset due to the relative velocity of the satellite 10 and the traffic station 30 combined with any frequency shift introduced by the satellite transponder due to a timing difference between the satellite's timing source and the traffic station's timing source.

The same local timing source is used in the traffic station 30 to transmit and receive the ranging burst. For example, the same timing source may be used to drive the uplink local oscillator 351 and the downlink local oscillator 361. Thus, any errors due to inaccuracies in the local timing source will substantially cancel out. However, the measured $\Delta f_C$ may also include a frequency offset that is proportional to the timing error between the local timing source and the satellite's timing source multiplied by the difference between the uplink and downlink channel center frequencies. This frequency offset is generally small enough to be ignored.

To determine $\Delta f_C$, the ranging burst may be demodulated by the demodulator 362 to produce digital samples that are provided to the SPM 340. Any frequency shift that occurred to the RF signals including the ranging burst as they traveled to and from the satellite 10 will be reflected in the demodulated data.

The SPM 340 may use a frequency analysis technique such as a Fast Fourier Transform (FFT) to analyze the digital samples to thereby determine the amount of frequency shift that occurred. Because the demodulated data is analyzed rather than the carrier wave directly, the measured frequency shift does not include differences between the uplink and downlink channel center frequencies, but instead is due to the Doppler Effect and any minor errors introduced by the satellite transponder. The size of the FFT and the amount of processing power required by the SPM 340 is proportional to the required frequency resolution, i.e., the desired accuracy of the $\Delta f_C$ measurement. Other techniques known to those skilled in the relevant art may also be used to determine the amount of frequency shift in the received ranging burst. For example, other known digital signal processing techniques or analog methods may be used.

In step 415, in some embodiments, prior to calculating the Doppler offset ratio, the estimate of $\Delta f_C$ may be filtered through the use of a smoothing filter, such as a low pass digital finite impulse response (FIR) filter. The FIR filter may be implemented in the SPM 340. Alternatively, the controller 310 can implement the software required to filter the measured $\Delta f_C$ values. The length of the FIR filter, i.e., the number of taps, may be adjusted, for example, based on the data rate of the channel. Alternatively, the smoothing may be accomplished through the use of an infinite impulse response (IIR) filter or through other techniques known to those skilled in the art. Because the output of the smoothing filter depends not only on the currently measured $\Delta f_C$ but also on the values of $\Delta f_C$ measured in previously received TDMA frames, anomalous $\Delta f_C$ measurements can thereby be smoothed out.

In step 420, a Doppler offset ratio ($DOP_{OR}$) is calculated by the SPM 240 based on the measured $\Delta f_C$ (or the output of the smoothing filter) and the known uplink and downlink center frequencies. The $DOP_{OR}$ is defined as the relative velocity of the traffic station 30 with respect to the satellite 10 divided by the speed of the carrier wave (approximately the speed of light).

When the speed of a carrier wave is much greater than the relative speed of the source and observer, the relationship between the observed frequency (f) of the carrier wave and the emitted source frequency ($f_s$) can be approximated as:

$$f \approx \left(1 - \frac{v}{c}\right) f_s$$

where v is the velocity of the source relative to the receiver (v is negative when the source is moving towards the observer and positive when the source is moving away from the observer); and c is the speed of the wave, i.e., approximately $3 \times 10^8$ m/s for electromagnetic waves travelling in a vacuum.

Thus, the change in observed frequency $\Delta f$ can be calculated as follows:

$$\Delta f = \left(-\frac{v}{c}\right) f_s$$

When the ranging burst propagates from the traffic station 30 to the satellite 10 and back, it experiences two frequency shifts due to the Doppler Effect. The first frequency shift ($\Delta f_1$) occurs when the burst propagates to the satellite 10 at the uplink center frequency ($f_{UL}$).

$$\Delta f_1 = \left(-\frac{v}{c}\right) f_{UL}$$

A second frequency shift ($\Delta f_2$) occurs when the burst propagates back to the traffic station 30 at the downlink center frequency ($f_{DL}$).

$$\Delta f_2 = \left(-\frac{v}{c}\right) f_{DL}$$

Thus, assuming that the entire measured frequency shift $\Delta f_C$ is due to the relative velocity of the traffic station 30 with respect to the satellite 10, i.e., ignoring any small frequency shift introduced by the satellite transponder due to a timing difference between the satellite's timing source and the traffic station's timing source, $\Delta f_C$ is equal to the sum of the two frequency shifts $\Delta f_1$ and $\Delta f_2$:

$$\Delta f_C = \Delta f_1 + \Delta f_2 = \left(-\frac{v}{c}\right) f_{UL} + \left(-\frac{v}{c}\right) f_{DL} = \left(-\frac{v}{c}\right)(f_{UL} + f_{DL})$$

The Doppler offset ratio ($DOP_{OR}$), which is defined as the relative velocity of the traffic station 30 with respect to the satellite 10 divided by the speed of the carrier wave, can be calculated as follows:

$$DOP_{OR} = \left(-\frac{v}{c}\right) = \Delta f_C / (f_{UL} + f_{DL})$$

As discussed above, rather than using $\Delta f_C$ to calculate $DOP_{OR}$ directly, the output of a smoothing filter having $\Delta f_C$ as its input may instead be used.

In step 425, the SPM 340 analyzes the reference burst 210 or a portion thereof in the same downlink TDMA frame as the ranging burst to determine a downlink frequency offset ($\Delta f_{DL}$). $\Delta f_{DL}$ can be measured using the same methods discussed with respect to $\Delta f_C$. $\Delta f_{DL}$ is a measure of the difference between the measured center frequency of the reference burst 210 and an expected center frequency. $\Delta f_{DL}$ is caused by a combination of the Doppler shift due to the relative velocity of the satellite 10 with respect to the traffic station 30 and the frequency shift caused by the timing difference between the timing source in the reference station 20 and the traffic station's downlink LO 361. Because the reference burst 210 is transmitted from the satellite transponder to all of the traffic stations simultaneously, any frequency shift that occurs on the uplink channel between the reference station 20 and the satellite 10 can generally be ignored.

$$\Delta f_{DL} = (DOP_{OR} * f_{DL}) + \Delta f_{ERR}$$

where ($DOP_{OR} * f_{DL}$) is the frequency shift due to the relative velocity of the satellite 10 with respect to the traffic station 30; and $\Delta f_{ERR}$ is the frequency shift caused by the timing difference between the timing source in the reference station 20 and the traffic station's downlink LO 361.

$\Delta f_{DL}$ may be measured using a different downlink TDMA frame than the downlink TDMA frame used to estimate $\Delta f_C$.

However, a more accurate estimate of the local oscillator offset ratio will result if both $\Delta f_{DL}$ and $\Delta f_C$ are measured using the same downlink TDMA frame because it is less likely that the relative velocity of the satellite 10 and the traffic station 30 will change significantly within a frame period.

In step 430, in some embodiments, prior to calculating a downlink offset ratio ($DL_{OR}$), multiple measurements of $\Delta f_{DL}$ are made and averaged by either the SPM 340 or the controller 310 through the use of a smoothing filter such as a digital finite impulse response (FIR) filter. The FIR filter may be implemented in the SPM 340. Alternatively, the FIR filter may be implemented in the controller 310. Alternatively, the smoothing may be accomplished through the use of an infinite impulse response (IIR) filter or through other techniques known to those skilled in the art.

In step 435, based on the measured $\Delta f_{DL}$ (or the output of the smoothing filter) and the known downlink center frequency ($f_{DL}$), a downlink offset ratio ($DL_{OR}$) may be calculated by the SPM 340. $DL_{OR}$ is defined as $\Delta f_{DL}$ divided by the downlink center frequency.

$$DL_{OR} = \Delta f_{DL}/f_{DL} = ((DOP_{OR} * f_{DL}) + \Delta f_{ERR})/f_{DL} = DOP_{OR} + \Delta f_{ERR}/f_{DL}$$

As discussed above, rather than using $\Delta f_{DL}$ to calculate $DL_{OR}$ directly, the output of a smoothing filter having $\Delta f_{DL}$ as its input may instead be used.

In step 440, the $DOP_{OR}$ is subtracted from the $DL_{OR}$ to determine the local oscillator offset ratio ($LO_{OR}$), which is equal to $\Delta f_{ERR}/f_{DL}$. The $LO_{OR}$ provides an indication of the difference in frequency between the downlink local oscillator 361 and the timing source in the reference station 20. $LO_{OR}$ is defined as $\Delta f_{ERR}$ divided by the downlink center frequency.

$$LO_{OR} = \Delta f_{ERR}/f_{DL} = DL_{OR} - DOP_{OR}$$

In step 445, to determine the optimal transmit frequency, the $DOP_{OR}$ is subtracted from the $LO_{OR}$ to determine a Transmit offset ratio ($T_{OR}$).

$$T_{OR} = LO_{OR} - DOP_{OR}$$

The $DOP_{OR}$ is subtracted from the $LO_{OR}$ because the purpose of the $T_{OR}$ is to adjust the frequency of the uplink signal transmitted by the traffic station 30 such that it arrives at the satellite 10 at the correct center frequency. Accordingly, if a positive Doppler shift is detected, which results in a positive $DOP_{OR}$, a negative frequency shift must be introduced in the uplink signal to be transmitted in order to counteract the Doppler shift such that the uplink signal arrives at the satellite 10 at the correct center frequency.

In step 450, the desired transmit base frequency ($f_B$) is multiplied by the $T_{OR}$ to produce a transmit frequency offset ($\Delta f_T$). The desired transmit base frequency may be the same as or different from the uplink frequency of the channel the ranging burst was sent on.

$$f_T = T_{OR} * f_B$$

Finally, in step 455, $\Delta f_T$ is added to $f_B$ to determine the optimal transmit center frequency ($f_T$).

$$f_T = f_B + \Delta f_T$$

The center frequency of the uplink signal generated by the traffic station 30 is then adjusted by the SPM 340 to be equal to $f_T$. Alternatively, center frequency of the uplink signal generated by the traffic station 30 may be set to a particular frequency based on $f_T$.

The transmit frequency can be adjusted by the SPM 340 using known methods. For example, the frequency of the uplink local oscillator 351 may be adjusted. Alternatively, the transmit frequency can be adjusted by shifting the frequency of the data to be modulated by the modulator 352 by an appropriate amount. Other techniques, well known to those skilled in the art, are also possible.

Although the foregoing procedure provides an accurate transmit frequency, the traffic station 30 will not always be able to transmit a ranging burst in each TDMA frame. Therefore, a method is needed for estimating the optimal transmit frequency in frames when a ranging burst is not transmitted by the traffic station 30.

When the ranging burst is not available in the received downlink TDMA frame, the reference burst 210 may be analyzed to determine the downlink frequency offset, which is caused by a combination of the Doppler shift due to the relative velocity of the satellite 10 with respect to the traffic station 30 and the timing difference between the timing source in the reference station 20 and the downlink local oscillator 361. Generally, the timing error between the reference station 20 and the downlink local oscillator 361 will remain relatively constant over short periods of time. Therefore, when the ranging burst is not available in a TDMA frame, the most recently calculated local oscillator offset ratio ($LO_{OR}$) is used, and a new Doppler offset ration ($DOP_{OR}$) is calculated based on an analysis of the reference burst 210.

Figure 5:
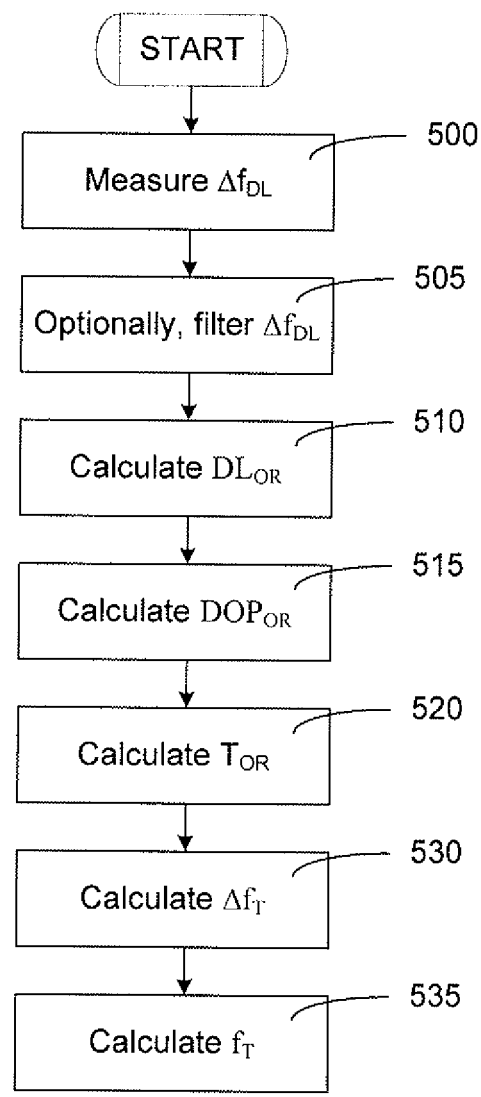
FIG. 5 is a flow diagram of a method of determining an optimal transmit center frequency when a ranging burst is not included in the received TDMA frame in accordance with an embodiment of the invention.

Referring now to FIG. 5, a flow diagram is provided that illustrates a method for determining the optimal transmit frequency when a ranging burst is not available in the received downlink TDMA frame. In this case, it is assumed that the previously calculated local oscillator offset ratio ($LO_{OR}$) remains unchanged and that any frequency shift changes detected when analyzing the reference burst 210 are the result of a change in relative velocity between the satellite 10 and the traffic station 30.

In step 500, the reference burst 210, or a portion thereof, is analyzed to determine a measured downlink frequency offset ($\Delta f_{DL}$). $\Delta f_{DL}$ can be measured using the same methods discussed with respect to $\Delta f_C$. $\Delta f_{DL}$ is a measure of the difference between the measured center frequency of the reference burst 210 and an expected center frequency. $\Delta f_{DL}$ is caused by a combination of the Doppler shift due to the relative velocity of the satellite 10 with respect to the traffic station 30 and the frequency shift caused by the timing difference between the timing source in the reference station 20 and the traffic station's downlink LO 361.

$$\Delta f_{DL} = (DOP_{OR} * f_{DL}) LO_{OR} * f_{DL})$$

where
($DOP_{OR} * f_{DL}$) is the frequency shift due to the relative velocity of the satellite 10 with respect to the traffic station 30; and ($LO_{OR} * f_{DL}$) is the frequency shift caused by the timing difference between the timing source in the reference station 20 and the traffic station's downlink LO 361

In step 505, in some embodiments, prior to calculating a downlink offset ratio, multiple estimates of the $\Delta f_{DL}$ are made by the SPM 340 and averaged through the use of a smoothing filter such as a digital finite impulse response (FIR) filter. Alternatively, the smoothing may be accomplished through the use of an infinite impulse response (IIR) filter or through other techniques known to those skilled in the art.

In step 510, based on the measured $\Delta f_{DL}$ and the known downlink center frequency ($f_{DL}$), a downlink offset ratio ($DL_{OR}$) may be calculated by the SPM 340. $DL_{OR}$ is defined as $\Delta f_{DL}$ divided by the downlink center frequency.

$$DL_{OR} = \Delta f_{DL}/f_{DL} = DOP_{OR} + LO_{OR}$$

As discussed above, rather than using $\Delta f_{DL}$ to calculate $DL_{OR}$ directly, the output of a smoothing filter having $\Delta f_{DL}$ as its input may instead be used.

In step 515, the previously determined local oscillator offset ratio ($LO_{OR}$) is subtracted from the $DL_{OR}$ to determine the Doppler offset ratio ($DOP_{OR}$).

$$DOP_{OR} = DL_{OR} - LO_{OR}$$

In step 520, the $DOP_{OR}$ is subtracted from the $LO_{OR}$ to determine a transmit offset ratio ($T_{OR}$).

$$T_{OR} = LO_{OR} - DOP_{OR}$$

In step 530, the desired transmit base frequency ($f_B$) is multiplied by the $T_{OR}$ to produce a transmit frequency offset ($\Delta f_T$).

$$\Delta f_T = T_{OR} * f_B$$

Finally, in step 535, $\Delta f_T$ is added to the $f_B$ to determine the optimal transmit center frequency ($f_T$).

$$f_T = f_B + \Delta f_T$$

The center frequency of the uplink signal generated by the traffic station 30 is then adjusted by the SPM 340 using known methods to be equal to $f_T$. Alternatively, the center frequency of the uplink signal generated by the traffic station 30 may be set to a particular frequency based on $f_T$.

In accordance with the above described embodiments, the magnitude of the average transmit frequency error of the traffic station 30 can be significantly reduced. Additionally, the calculated Doppler offset ratio and local oscillator offset ratio can be used to adjust the data rate of the information that is modulated onto the uplink signal to be transmitted to thereby ensure that the information is transmitted at the correct time with respect to the TDMA frame.

Moreover, it will be apparent to those of ordinary skill in the art that variations with respect to the order of the sequence of the disclosed steps may be applied without departing from the concept, spirit, and scope of the invention. Further, steps may be combined with other steps to improve the efficiency of the described methods and additional steps may be added without departing from the concept, spirit, and scope of the invention.

Although the present invention has been described in terms of a TDMA based satellite communication system, the methods disclosed and claimed herein may be employed in any wireless communication system. A satellite need not be employed to retransmit the ranging burst. For example, another network device, such as a cellular base station may be used to perform this function. Additionally, the system need not be a TDMA based system. For example, in a frequency division multiple access system, a mobile device may determine a Doppler offset ratio by transmitting a signal to an earth-bound base station at an uplink frequency. The base station retransmits the signal to the mobile station at a different downlink frequency, for example, via a transponder. The mobile station analyzes the signal received from the base station to calculate a Doppler offset ratio as described above. Similarly, the mobile station may receive a separate reference signal produced by the base station. The mobile station can measure the frequency shift associated with the received reference signal and combine this information with the calculated Doppler offset ratio to determine a local oscillator offset ratio. The local oscillator offset ratio and the Doppler offset ratio can be used to adjust the transmit center frequency of the mobile station. Thus, the methods disclosed and claimed herein are equally applicable to ground based wireless communication systems, and also to systems that do not employ TDMA.

All of the methods disclosed and claimed herein may be executed using a variety of different hardware devices. For example, the steps of the above described methods need not be executed by the SPM 340. Many of the steps may instead be executed by a generic processor included in the traffic station 30. Alternatively, portions of the disclosed methods may be performed by hardware that is not directly included in the traffic station 30. For example, a device connected to the traffic station 30 via the external I/O interfaces 320 may perform some of the disclosed steps.

In a particularly advantageous embodiment, only the steps involving calculating frequency offsets, e.g., $\Delta f_C$, $\Delta f_{DL}$, are performed by the SPM 340. The remaining steps, e.g., the filtering steps and other calculations, may be performed by other hardware in the system. Thus, high speed digital signal processing resources, which are often scarce and expensive, need not be used to perform the majority of the described steps.

Additionally, characteristics of currently deployed systems may be exploited such that new hardware and/or software may not be required to perform each and every one of the described steps of the method. For example, $\Delta f_C$ or $\Delta f_{DL}$ may be calculated for other purposes in a given communication system. In such a system, these measurements may be used in the disclosed methods.

All of the apparatus, methods, and algorithms disclosed and claimed herein can be made and executed without undue experimentation in light of the present disclosure. While the invention has been described in terms of preferred embodiments, it will be apparent to those of ordinary skill in the art that variations may be applied to the apparatus, methods, and sequence of steps of the method without departing from the concept, spirit, and scope of the invention. More specifically, it will be apparent that certain components may be added to, combined with, or substituted for the components described herein while the same or similar results would be achieved. All such similar substitutes and modifications apparent to one of ordinary skill in the art are deemed to be within the spirit, scope, and concept of the invention as defined.

What is claimed is:

1. A method for determining an optimal transmission center frequency, comprising the steps of:
   transmitting, via a first uplink channel, a burst of information from a traffic station to a network device;
   receiving at said traffic station, from the network device, the burst of information and a reference burst;
   calculating a Doppler offset ratio based on the burst of information received at said traffic station from the network device, a downlink frequency shift based on the reference burst received at said traffic station, and a local oscillator offset ratio based on the Doppler offset ratio and the downlink frequency shift; and
   adjusting a transmission frequency for a second uplink channel based on the Doppler offset ratio and said local oscillator offset ratio.

2. The method according to claim 1, wherein said calculating step further comprises calculating a combined frequency shift based on the burst of information, and calculating said Doppler offset ratio based on the combined frequency shift.

3. The method according to claim 2, wherein the combined frequency shift is calculated by performing a Fast Fourier Transform (FFT) on the received burst of information and the downlink frequency shift is calculated by performing a Fast Fourier Transform (FFT) on the received reference burst.

4. The method according to claim 1, further comprising:
   after receiving the reference burst and the burst of information at said traffic station, receiving, from the network device, a second reference burst at said traffic station;

calculating an updated downlink frequency shift based on said second reference burst received at said traffic station, and an updated Doppler offset ratio based on said updated downlink frequency shift and the local oscillator offset ratio that was previously calculated; and adjusting the transmission frequency for the second uplink channel based on said updated Doppler offset ratio and the local oscillator offset ratio that was previously calculated.

5. The method according to claim 4, wherein the burst of information is transmitted by the traffic station in a first uplink Time Division Multiple Access (TDMA) frame, the burst of information and the reference burst are both received by the traffic station in a first downlink TDMA frame, and the second reference burst is received by the traffic station in a second downlink TDMA frame.

6. The method according to claim 1, further comprising periodically repeating said transmitting, said receiving, said calculating and said adjusting to maintain said optimal transmission center frequency.

7. The method according to claim 6, further comprising the steps of:
determining a frequency shift value for a plurality of said bursts of information received at said traffic station;
applying each of the determined frequency shift values to an input of a filter; and calculating the combined frequency shift based on an output of the filter.

8. The method according to claim 7, wherein the frequency shift value for each said received of burst of information is calculated using a Fast Fourier Transform (FFT).

9. The method according to claim 6, further comprising the step of:
measuring a frequency shift value for a plurality of said reference bursts; applying each of the measured frequency shift values to an input of a filter; and calculating the downlink frequency shift based on the output of the filter.

10. The method according to claim 9, wherein the frequency shift value for each of the plurality of reference bursts is calculated using a Fast Fourier Transform (FFT).

11. The method according to claim 1, wherein the burst of information is transmitted by the traffic station in a first uplink Time Division Multiple Access (TDMA) frame.

12. The method according to claim 11, wherein the burst of information and the reference burst are both received by the traffic station in a first downlink TDMA frame.

13. The method according to claim 1, further comprising adjusting a data rate of a second burst of information transmitted by said traffic station to said network device based on the Doppler offset ratio and the local oscillator offset ratio.

14. A traffic station comprising:
a transmitter;
a receiver;
a controller communicatively coupled to the transmitter and the receiver, the controller configured to:
cause said transmitter to transmit, via a first uplink channel, a burst of information from said traffic station to a network device;
monitor an output of said receiver to identify a reference burst and the burst of information re-transmitted from the network device and received at said traffic station;
calculate a Doppler offset ratio based on the burst of information received at said traffic station from the network device, a downlink frequency shift based on the reference burst received at said traffic station, and a local oscillator offset ratio based on the Doppler offset ratio and the downlink frequency shift; and
selectively adjust a transmission frequency for a second uplink channel of said transmitter based on the Doppler offset ratio and said local oscillator offset ratio.

15. The traffic station according to claim 14, wherein said controller is configured to calculate a combined frequency shift based on the burst of information, and calculate said Doppler offset ratio based on the combined frequency shift.

16. The traffic station according to claim 15, wherein said combined frequency shift is calculated by performing a Fast Fourier Transform (FFT) on the received burst of information, and the downlink frequency shift is calculated by performing a Fast Fourier Transform (FFT) on the received reference burst.

17. The traffic station according to claim 14, wherein said controller is further configured to:
after receiving the reference burst and the burst of information at said traffic station, monitor the output of said receiver to identify a second reference burst received at said traffic station;
calculate an updated downlink frequency shift based on said second reference burst received at said traffic station, and calculate an updated Doppler offset ratio based on said updated downlink frequency shift and the local oscillator offset ratio that was previously calculated; and
selectively adjust the transmission frequency for the second uplink channel of said transmitter based on said updated Doppler offset ratio and the local oscillator offset ratio that was previously calculated.

18. The traffic station according to claim 17, wherein the burst of information is transmitted by the traffic station in a first uplink Time Division Multiple Access (TDMA) frame, the burst of information and the reference burst are both received by the traffic station in a first downlink TDMA frame, and the second reference burst is received by the traffic station in a second downlink TDMA frame.

19. The traffic station according to claim 14, wherein said controller is further configured to periodically repeat said transmitting, said monitoring, said calculating and said adjusting to maintain said optimal transmission center frequency.

20. The traffic station according to claim 19, wherein said controller is further configured to:
determine a frequency shift value for a plurality of said bursts of information received at said traffic station;
apply each of the determined frequency shift values to an input of a filter; and calculate the combined frequency shift based on an output of the filter.

21. The traffic station according to claim 20, wherein the frequency shift value for each of said received bursts of information is calculated using a Fast Fourier Transform (FFT).

22. The traffic station according to claim 19, wherein said controller is further configured to:
determine a frequency shift value for a plurality of said reference bursts;
apply each of the determined frequency shift values to an input of a filter; and
calculate the downlink frequency shift based on the output of the filter.

23. The traffic station according to claim 22, wherein the frequency shift value for each of the plurality of reference bursts is calculated using a Fast Fourier Transform (FFT).

24. The traffic station according to claim 14, wherein the burst of information is transmitted by the traffic station in a first uplink Time Division Multiple Access (TDMA) frame.

25. The traffic station according to claim 24, wherein the burst of information and the reference burst are both received by the traffic station in a first downlink TDMA frame.

26. The traffic station according to claim 14, wherein said controller is further configured to adjust a data rate of a second burst of information transmitted by said traffic station to said network device based on the Doppler offset ratio and the local oscillator offset ratio.

27. A computer-readable medium having computer-executable instructions for performing a method comprising the following steps:

transmitting, via a first uplink channel, a first burst of information to a network device;

receiving, via one or more downlink channels, the first burst of information and a reference burst from the network device;

calculating a combined frequency shift based on the received first burst of information;

calculating a Doppler offset ratio based on the calculated combined frequency shift;

calculating a downlink frequency shift based on the received reference burst;

calculating a local oscillator offset ratio based on the Doppler offset ratio and the calculated downlink frequency shift;

adjusting a transmission frequency for a second uplink channel based on the Doppler offset ratio and the local oscillator offset ratio;

after receiving the reference burst and the first burst of information, receiving, via the one or more downlink channels, a second reference burst from the network device;

calculating an updated downlink frequency shift based on said second reference burst, and an updated Doppler offset ratio based on said updated downlink frequency shift and the local oscillator offset ratio that was previously calculated; and adjusting the transmission frequency for the second uplink channel based on the updated Doppler offset ratio and the local oscillator offset ratio that was previously calculated;

wherein said combined frequency shift is a frequency shift due to the velocity of the traffic station relative to the network device, combined with any frequency shift introduced by a timing difference between a timing source used by the network device and a timing source used by the traffic station; and wherein said combined frequency shift is determined by analyzing demodulated data contained in said burst of information rather than by directly measuring the frequency of carrier wave.

28. A method for determining an optimal transmission center frequency, comprising the steps of:

transmitting, via a first uplink channel, a burst of information from a traffic station to a network device;

receiving at said traffic station, from the network device, a reference burst in a Time Division Multiple Access (TDMA) frame;

if the received TDMA frame contains the burst of information that was transmitted by the traffic station to the network device, calculating a Doppler offset ratio based on the burst of information received in the TDMA frame, calculating a downlink frequency shift based on the reference burst, calculating a local oscillator offset ratio based on the Doppler offset ratio and the downlink frequency shift, and adjusting a transmission frequency for a second uplink channel based on the Doppler offset ratio and the local oscillator offset ratio; and if the received TDMA frame does not contain the burst of information that was transmitted by the traffic station to the network device, calculating an updated downlink frequency shift based on the reference burst, calculating an updated Doppler offset ratio based on the updated downlink frequency shift and a previously calculated local oscillator offset ratio, and adjusting the transmission frequency for the second uplink channel based on the updated Doppler offset ratio and the previously calculated local oscillator offset ratio;

wherein said Doppler offset ratio is determined based on a combined frequency shift due to the velocity of the traffic station relative to the network device, combined with any frequency shift introduced by a timing difference between a timing source used by the network device and a timing source used by the traffic station; and wherein said combined frequency shift is determined by analyzing demodulated data contained in said burst of information rather than by directly measuring the frequency of a carrier wave.

\* \* \* \* \*